(12) United States Patent
Abuelsaad et al.

(10) Patent No.: US 10,275,796 B2
(45) Date of Patent: Apr. 30, 2019

(54) SYSTEM AND METHOD TO PROVIDE INFORMATION BASED ON PREDICTED ROUTE OF TRAVEL

(71) Applicant: INTERNATIONAL BUSINESS MACHINES CORPORATION, Armonk, NY (US)

(72) Inventors: Kelly Abuelsaad, Somers, NY (US); Lisa Seacat Deluca, Baltimore, MD (US); Soobaek Jang, Hamden, CT (US); Daniel C. Krook, Fairfield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 417 days.

(21) Appl. No.: 14/301,727

(22) Filed: Jun. 11, 2014

(65) Prior Publication Data
US 2015/0363830 A1    Dec. 17, 2015

(51) Int. Cl.
*G06Q 30/00* (2012.01)
*G06Q 30/02* (2012.01)

(52) U.S. Cl.
CPC ............................... *G06Q 30/0266* (2013.01)

(58) Field of Classification Search
None
See application file for complete search history.

(56) References Cited

U.S. PATENT DOCUMENTS

| | | | |
|---|---|---|---|
| 6,898,517 B1* | 5/2005 | Froeberg | G01C 21/26 340/691.6 |
| 7,528,738 B1* | 5/2009 | Garrett, Sr. | G08G 1/165 116/67 R |
| 8,090,358 B2 | 1/2012 | Sherman et al. | |
| 2002/0119752 A1* | 8/2002 | Bates | H04H 20/10 455/45 |
| 2004/0145684 A1* | 7/2004 | Albert | B60N 2/4876 348/837 |
| 2004/0181324 A1* | 9/2004 | Arata | G01C 21/34 701/23 |
| 2006/0173841 A1* | 8/2006 | Bill | G01C 21/3407 |
| 2007/0194902 A1* | 8/2007 | Blanco | G01C 21/365 340/461 |
| 2007/0260393 A1* | 11/2007 | Abernethy, Jr. ... | G01C 21/3644 701/438 |

(Continued)

FOREIGN PATENT DOCUMENTS

WO    2010126450    11/2010
WO    2012145795    11/2012

OTHER PUBLICATIONS

U.S. Appl. No. 13/975,801, filed Aug. 26, 2013, 35 pages.

*Primary Examiner* — Meredith A Long
(74) *Attorney, Agent, or Firm* — Brian M. Restauro; Andrew M. Calderon; Roberts Mlotkowski Safran Cole & Calderon, P.C.

(57) ABSTRACT

A method implemented in a computer infrastructure having computer executable code tangibly embodied on a computer readable storage medium having programming instructions operable to determine a current location of a user, predict a change of direction of the user, and provide at least one advertisement to the user based on the predicted change of direction of the user.

18 Claims, 4 Drawing Sheets

(56) References Cited

U.S. PATENT DOCUMENTS

| | | | |
|---|---|---|---|
| 2008/0211652 A1* | 9/2008 | Cope | B60K 35/00 |
| | | | 340/461 |
| 2009/0006194 A1* | 1/2009 | Sridharan | G06Q 30/02 |
| | | | 705/14.62 |
| 2011/0093330 A1* | 4/2011 | Burckart | G06Q 30/02 |
| | | | 705/14.46 |
| 2013/0054361 A1* | 2/2013 | Rakshit | G06Q 30/0261 |
| | | | 705/14.53 |
| 2014/0040016 A1 | 2/2014 | Amla et al. | |

* cited by examiner

SYSTEM AND METHOD TO PROVIDE INFORMATION BASED ON PREDICTED ROUTE OF TRAVEL

FIELD OF THE INVENTION

The present invention generally relates to systems and methods of providing targeted information, and more particularly, to systems and methods of providing advertisements based on location and a predicted direction of travel of a user.

BACKGROUND

Occupants of a vehicle, e.g., drivers and passengers, are commonly exposed to large amounts of information during their travels. This information can be, for example, road signs, advertisements and other external stimuli. By way of example, advertisements can appear on billboards, buildings, e.g., retail outlets and eateries, etc., vehicles, etc.

Many advertisements such as those found on billboards and retail outlets, including restaurants, etc., remain static, but can periodically change; whereas, other types of advertisements are dynamic and are meant to change such as, for example, LCD displays or advertisements provided on smart phones. These dynamic advertisements allow for more interactive advertisements.

SUMMARY

In a first aspect of the invention, a method comprises determining, using at least one computing device, a current location of a user, predicting, using at least one computing device, a change of direction of the user, and providing at least one advertisement to the user based on the predicted change of direction of the user.

In a further aspect of the invention, there is a computer system for providing advertisements. The system includes a CPU, a computer readable memory and a computer readable storage medium. Additionally, the system includes one or more program instructions. The program instructions are operable to detect an indication of a change in direction of a vehicle, predict a change of direction of the vehicle based on the detected indication of the change of direction, select and broadcast at least one of advertisement to at least one user within the vehicle based on the predicted change of direction. The program instructions are stored on the computer readable storage medium for execution by the CPU via the computer readable memory.

In another aspect of the invention, there is a computer program product for providing advertisements. The computer program product includes a computer usable storage medium having program code embodied in the storage medium. The program code is readable/executable by a computing device to cause the computing device to determine a current location of a vehicle, detect an indication of a change in direction of the vehicle, predict a change of direction of the vehicle based on the detected indication of the change of direction, select at least one advertisement of a plurality of advertisements based on the predicted change of direction, and provide the at least one advertisement.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
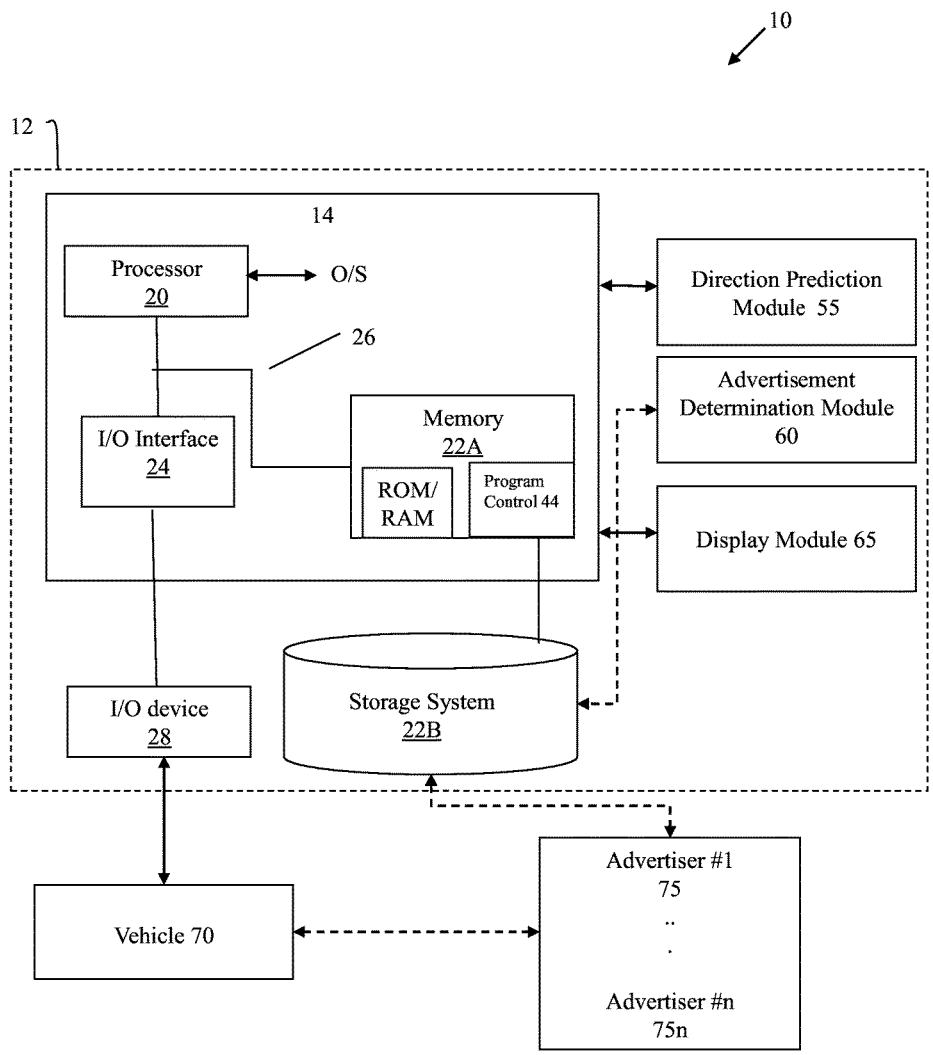
FIG. 1 is an illustrative environment for implementing steps in accordance with aspects of the invention.

The present invention generally relates to systems and methods of providing targeted information, and more particularly, to systems and methods of providing advertisements based on a predicted direction of travel of a user. By predicting a direction of travel of a user, it is now possible to show advertisements before the user reaches a particular location associated with the advertisement, e.g., retail establishment, etc. The advertisements can consist of, for example, promotional information such as coupons which are displayed to the user, amongst other things.

In embodiments, the advertisements can be displayed on a user's smart phone, laptop, vehicular GPS system or other computing device, based on a predicted direction of a vehicle. In this way, it is now possible to target advertisements to particular users as they approach, for example, a retail establishment such as an eatery, etc. In even further examples, the advertisements can be displayed on a billboard, within a heads-up display of a vehicle or other pervasive devices located within the vehicle, e.g., projected onto monitors on headrests, etc. In addition, the present invention contemplates that the advertisements can be spoken aloud on a vehicle's entertainment system. In embodiments, the advertisements can be dynamically selected, for example, based on the location and predicted direction of travel of the vehicle. This can be accomplished by, e.g., turn signal engagement, wheel movement of the vehicle, interaction with a vehicle's GPS system, etc., as described herein. Thus, by dynamically selecting and displaying advertisements in this manner, the present invention increases the advertising effectiveness, e.g., reduces the number of advertisements that are sent to users that will not pass by a certain establishment, etc.

In any of the implementations of the present invention, advantageously, advertisers, e.g., retail stores, can target advertisements to those consumers that may pass by or are approaching their establishments. This serves several purposes, e.g.: (i) ensures advertisements can reach users before they pass certain establishments, which will benefit the users by alerting them of sales, etc. for a particular establishment or of certain items being sold within the establishments, and (ii) reduces advertisement costs by not providing, e.g., displaying, advertisements to users that will never travel by the advertiser's establishment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows an illustrative environment 10 for managing the processes in accordance with the invention. To this extent, environment 10 includes a server 12 or other computing system that can perform the processes described herein. In particular, server 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. The external I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls a direction prediction module 55, an advertisement determination module 60, and a display module 65, e.g., the processes described herein. The direction prediction module 55, advertisement determination module 60, and display module 65 can be implemented as one or more program code in program control 44 stored in memory 22A as separate or combined modules. Additionally, the direction prediction module 55, advertisement determination module 60, and display module 65 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in computing device 14.

The computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, computing device 14, including the direction prediction module 55, advertisement determination module 60, and display module 65 may be provided in a vehicle 70 and may be configured to determine a current location, predict a direction of travel (and hence new location), collect advertisement data using the predicted direction of travel, and display advertisement data from one or more advertiser(s) 75, e.g., the processes described herein. On the other hand, any combination of computing device 14, direction prediction module 55, and advertisement determination module 60 may be instantiated on a separate computing system or environment remote from vehicle 70 (e.g., computing device may be located on a client computing system or environment). In still an alternative embodiment, any combination of computing device 14, direction prediction module 55, advertisement determination module 60, and display module 65 may be implemented using a mobile device in vehicle 70. For example, computing device 14, direction prediction module 55, and advertisement determination module 60, may be implemented in a server (e.g., server 12) operated by a service provider, while the display module 65 is provided on a computing device within a vehicle.

In embodiments, advertiser(s) 75 may provide advertisements to an end user based on a predicted direction of vehicle 70. For example, based on a predicted direction of travel and hence an anticipated location of a vehicle, advertiser(s) 75 can send advertisements to, e.g., a smart phone, a laptop, a vehicular GPS system or other computing device, a heads-up display or pervasive devices located within the vehicle, e.g., projected onto monitors on headrests, etc., a vehicle's entertainment system, or even a billboard, etc. The advertiser(s) 75 may be configured to communicate through the Internet, a wide area network, a local area network, a virtual private network, a mobile network, and/or the like. The advertisements can be stored in a database, and can be associated with different locations. For example, an advertisement can be linked (via a pointer) to a specific establishment located at a particular location.

In embodiments, the direction prediction module 55 may be configured to determine a current location of vehicle 70, receive an indication of a change in direction of vehicle 70, and predict a new direction for vehicle 70. The prediction can be based on, for example, the activation of a turn signal, etc. The advertisement determination module 60 may be configured to collect and determine which advertisements to provide to one or more display or communication devices based on a predicted direction of travel received from the direction prediction module 55. The display module 65 may be configured to communicate and/or display (or otherwise provide) the advertisements to a user, provided by the advertisement determination module 60.

Figure 2:
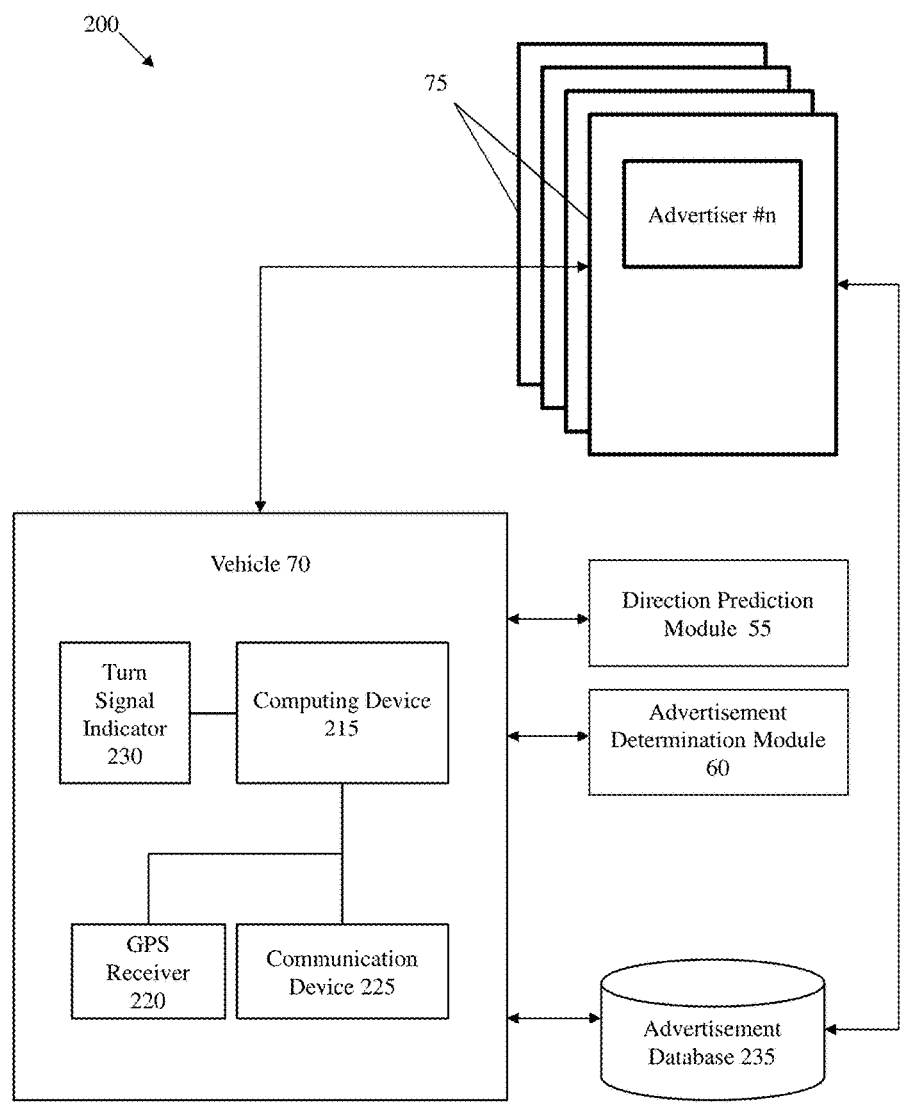
FIG. 2 shows a high level architecture for implementing processes in accordance with aspects of the invention.

FIG. 2 is a high level architecture for implementing processes in accordance with aspects of the present invention. More specifically, FIG. 2 depicts a system 200 comprising vehicle 70 in communication with advertiser(s) 75, as discussed with respect to FIG. 1. The vehicle 70 may be, for example, an automobile, truck, taxi, bus, train, bicycle, motorcycle or scooter, boat, motor-home, train, etc. An individual carrying a mobile device can also be represented by reference numeral 70 for purposes of this discussion. In embodiments, vehicle 70 may communicate directly or indirectly with advertiser(s) 75. For example, vehicle 70 may communicate directly with advertiser(s) 75 over a communication network, or indirectly by obtaining advertisements stored in an advertisement database 235 (e.g., advertisement database 22B, as discussed with respect to FIG. 1) maintained by a third party service provider or a combination thereof. In embodiments, vehicle 70 may be configured to communicate with advertiser(s) 75 through a separate computer system provided by a service provider comprising the computing device 14 (as discussed above with respect to FIG. 1).

In embodiments, vehicle 70 may include a computing device 215 (e.g., computing device 14, as discussed with respect to FIG. 1), a GPS 220, a communication device 225, and a turn signal indicator 230. The GPS 220 may be configured to determine a current geographical location of vehicle 70 and the direction in which vehicle 70 is traveling. For example, GPS 220 may be a built in vehicle navigation system or a mobile GPS device located in vehicle 70. However, as should be understood by one ordinary skill in the art, other techniques for determining a geographical location and a direction of travel of vehicle 70 may be employed. For example, such techniques may include triangulation using radio, cellular signals, signpost location systems, automobile mesh network information, directional data, and/or the like.

In embodiments, communication devices 225 (controlled by display module 60, as discussed with respect to FIG. 1) are configured to display or otherwise provide advertisements of advertiser(s) 75 to a user based on a predicted route of travel. For example, the advertisements may be displayed on a billboard, within a heads up display of vehicle, entertainment system, GPS display or other computing device within the vehicle 70, e.g., laptop, smart phone, etc., all of which are represented at reference numeral 225. The communication devices 225 may take many different forms, including for example, a liquid crystal display (LCD), a thin-film-transistor liquid crystal display (TFT LCD), a light emitting diode (LED) display, an organic light emitting diode (OLED) display, a plasma display, a projection display, a cathode ray tube (CRT) display, an optical fiber screen display, or any other type of device capable of displaying or providing data.

In embodiments, turn signal indicator 230 is used to indicate a change of direction of vehicle 70. For example, a change of direction may be indicated by turning on a left turn signal, turning on a right turn signal, or turning off a turn signal. However, as should be understood by one ordinary skill in the art, other techniques for determining a change of direction of a vehicle may be employed. For example, a detection in a change of direction can be sensed or detected by a change in direction in the wheels of vehicle 70, a change of direction as determined by GPS 220, motion sensors, and/or the like may be used to detect an upcoming change in direction. In embodiments, activation of turn signal 230 may be detected by computing device 215 which may be configured to send the turn signal activation information to direction prediction module 55. Alternatively, as would be understood by one of ordinary skill in the art, direction prediction module 55 may be configured to detect activation of turn signal 230, itself. In other embodiments, the direction prediction module 55 may be configured to detect a change of direction through other mechanisms including, e.g., detect a change in direction in the steering of vehicle 70 using a drive by wire sensor, GPS information or wheel sensors.

In any of the embodiments, the direction prediction module 55 is configured to receive an indication of a change in direction, and based on this received information predict a new direction for vehicle 70. For example, direction prediction module 55 may receive a current location and direction of travel from GPS receiver 220 (or may be configurable to determine a current location of vehicle 70, itself, using location determination methods, as discussed herein). The direction prediction module 55 may also receive an indication of a change in direction of vehicle 70 from turn signal indicator 230 or in the other mechanisms described herein. Using the current location, direction of travel, and the turn signal information, for example, the direction prediction module 55 can predict a new direction of travel based on the current location information (e.g., received from GPS 220) and a direction indicated by turn signal 230. For example, if vehicle 70 is headed northbound and direction prediction module 55 receives an indication that vehicle 70 will turn in an eastbound direction, then direction prediction module 55 will predict that vehicle 70 will be traveling in an eastbound direction, at the next intersection. Similar calculations may be made using the sensors, direction of the wheels, etc.

As should be understood by one ordinary skill in the art, the predicted direction can range from a general direction to a precise direction based on a known street map, current location and/or the turning of the vehicle, and/or speed of the vehicle, amongst other things. For example, direction prediction module 55 may predict a new direction of travel for vehicle 70 or may predict a general change in direction based on the direction indicated by turn signal indicator 230. Illustratively, the predicted direction can be a Cardinal direction (e.g., north, east, south, or west), a direction of travel down a specific street (e.g., eastbound on 124 West Main Street, Smallville, N.Y.), a range of streets/blocks, and/or the like. The predicted direction, as provided by direction prediction module 55, may be sent to advertisement determination module 60, for additional processing.

The advertisement determination module 60 is configured to determine which advertisements to be displayed based on the predicted direction received from direction prediction module 55. For example, advertisement determination module 60 may be configured to determine which advertiser(s) 75 wish to display advertisements to vehicle 70 based on the direction received from direction prediction module 55.

In embodiments, the advertisement determination module 60 may determine which advertisements to display based on different factors. For example, advertisements may be displayed or otherwise provided based on targeted advertising, location of vehicle 70, anticipated location of vehicle 70, passenger demographics, particular interests of one or more passengers in vehicle 70, and/or the like. In embodiments, the advertisement determination module 60 may primarily display advertisements for advertiser(s) 75 based on the predicted direction of travel for vehicle 70. For example, advertisements may be displayed in vehicle 70 for advertiser(s) 75 physically located in the predicted direction of travel.

In embodiments, these advertisements can be provided prior to the vehicle 70 making the predicted change of direction. For example, advertisements will be provided to the user, e.g., to communication devices 225 in vehicle 70 for advertiser(s) 75 in the predicted direction, prior to vehicle 70 traveling in the predicted direction. Alternatively, advertisements may be provided to vehicle 70 at the time the vehicle (or user) physically changes direction based on the change of direction. For example, once vehicle 70 makes the turn indicated by turn signal indicator 230, or by the other mechanisms described herein, the advertisements will be displayed or otherwise provided to vehicle 70 for advertiser(s) 75 in that new direction and/or, for example, an anticipated upcoming location of the vehicle 70 based on the criteria described herein.

In embodiments, the advertisement determination module 60 may be configured to determine which advertisements to provide during periods in which no change in direction is indicated. For example, when vehicle 70 continues in the same direction for a period of time, the advertisement determination module 60 will update the advertisements for advertiser(s) 75 in the current direction of travel. The vehicle 70 will continually receive advertisements for approaching advertiser(s) 75 until there is a change in direction. This can be based on speed of vehicle 70, known current locations, and past locations of vehicle 70, for example.

Figure 4:
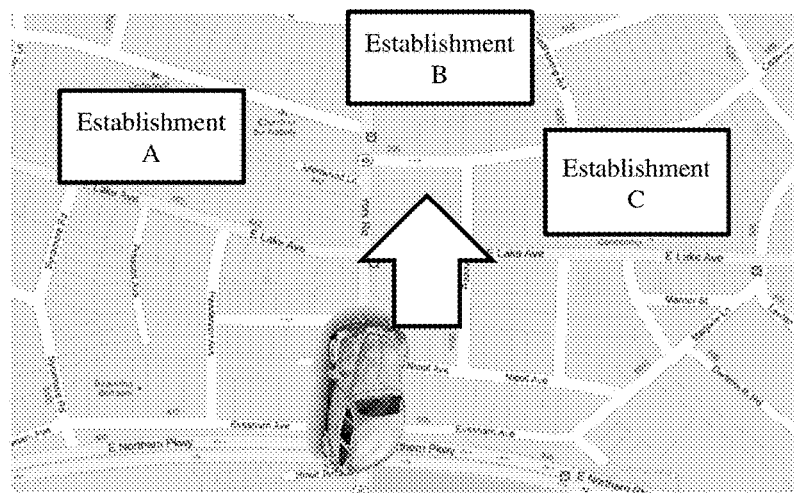
FIGS. 4 and 5 show a visual representation of an example of operation in accordance with aspects of the invention.

Still referring to FIG. 2, advertisement database 235 may store a set of advertisements for advertiser(s) 75 that may be selectively displayed or otherwise provided on communication devices 225, based on the location and direction information of the vehicle 70 provided by the direction prediction module 55. The advertisements stored in the advertisement database 235 may be associated, without limitation, goods, services, businesses, restaurants, venues, events, historic sites, parks, landmarks, and/or the like. In embodiments, promotional information about the advertiser(s) 75 may also be provided. For example, coupons for the advertiser(s) 75 could be displayed on communication device 225. In embodiments, advertisement database 235 may include location data corresponding to the stored advertisements. For example, the location data for a given advertisement may indicate that the advertisement is related to: 1) a specific location (e.g., Establishment A or Establishment B (as shown in FIG. 4)), or an address (e.g., 124 West Main Street, Smallville, N.Y.); 2) a set of locations, where there are multiple locations (e.g., a national chain of gas stations, restaurants, etc.); and/or 3) no particular location (e.g., a political campaign, a product, and/or the like).

Flow Diagram

Figure 3:
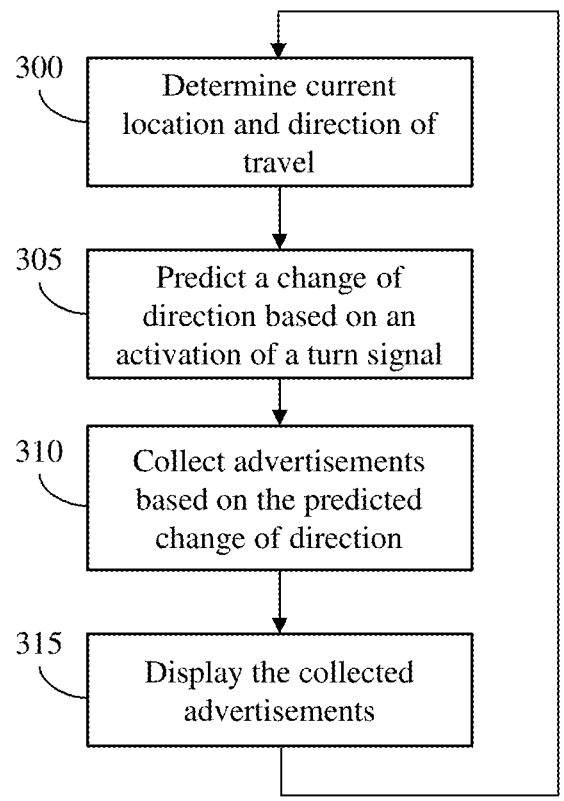
FIG. 3 shows an exemplary flow in accordance with aspects of the invention.

FIG. 3 shows an exemplary flow for performing aspects of the present invention. The steps of FIG. 3 may be implemented in the environments of FIGS. 1 and 2, for example. As noted above, the flowchart(s) illustrate the architecture, functionality, and operation of possible implementations of systems, methods, and computer program products as already described herein in accordance with the various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

At step 300, a current location and direction of travel of a vehicle are determined via a GPS device, for example. At step 305, an indication of a change of direction is detected and a new direction is predicted for the vehicle. For example, an indication of a change of direction is detected by an activation of a turn signal in the vehicle. In embodiments, detection of the change of direction may be triggered immediately upon activation of the turn signal or after the turn signal had been activated for a pre-determined period of time, or after the turn signal has been turned off, e.g., after a vehicle has turned. The new direction is predicted based on the current location, direction of the vehicle (as determined in step 300), and the detected indicated change of direction (as determined in step 305). The new direction can also be predicted by other means, as described herein.

At step 310, based on the predicted new direction, advertisements and location data associated therewith are collected. In embodiments, the advertisements based on location data can be received from an advertisement database. For example, a request for advertisements and a predicted direction are sent to the advertisement database and advertisements from the corresponding predicted direction are returned to the vehicle to be displayed or otherwise predicted. In embodiments, the advertisements may also be obtained from third party advertiser devices or service providers. For example, advertiser(s) are notified of the predicted direction of the vehicle and, in response, may push and/or pull select advertising to the vehicle or other computing device. Advertisement determination mechanism as described herein may determine which advertisements to display, where to display the advertisements, and how to display the advertisements based on the direction of the vehicle and targeted information as already described herein. For example, the advertisements may be displayed or otherwise provided to different combinations of available display or communication devices based on demographics, locations within the vehicle, and/or displayed universally throughout the vehicle.

At step 315, the advertisements are sent to a display or other communication controller which may broadcast the advertisements to select display or other communication devices within the vehicle. For example, advertisements may be displayed on the vehicle navigation display, and/or on mobile devices located within vehicle. In embodiments, the advertisements can also be displayed on upcoming signage/billboards. In any scenario, the advertisement determination may continually refresh available advertisements as the vehicle continues to travel in a certain direction. For example, advertisements displayed in the vehicle will be continually updated for advertiser(s) in the direction of travel such that once the vehicle passes an establishment associated with a first advertisement, such advertisement can then be updated for an upcoming advertisement. In embodiments, upon detection of a new indicated change in direction, the process returns to step 300 and repeats.

Example of Operation

Figure 5:
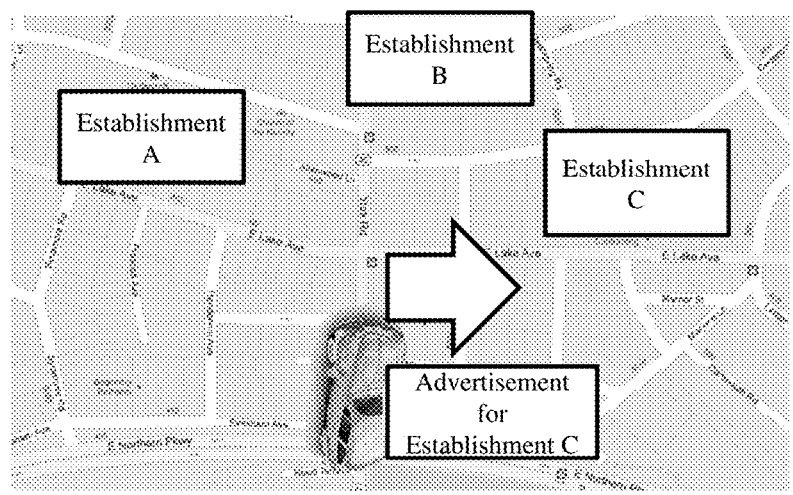

An example of operation is shown in FIGS. 4 and 5. These examples are not to be considered limiting features of the present invention, and are provided herein for illustrative purposes. As shown in FIG. 4, a vehicle (e.g., vehicle 70) is initially travelling north on York road. In this example, there are three businesses that have advertisements in the area: Establishment A, Establishment B, and Establishment C.

Establishment A is physically located to the northwest of the vehicle, Establishment B is physically located to the north of the vehicle, and Establishment C is located to the northeast of the vehicle. Based on the current location of the vehicle, advertisements for all three establishments would be retrieved from an advertisement database (e.g., advertisement database 235) to be broadcast and/or displayed to the passengers in the vehicle.

In FIG. 5, the user activates the right turn signal in the vehicle, indicating that the vehicle will be turning right onto East Lake Avenue. Based on this turn signal or other mechanisms described herein, the system predicts that the vehicle will turn right and will be travelling east on East Lake Ave. Based on the predicted change of direction, the system will determine that Establishment C is an advertiser wishing to advertise to users travelling towards its establishment along East Lake Avenue, and will select and display or otherwise broadcast certain advertisements for Establishment C to the users in the vehicle. In this example, Establishment A and Establishment B would not display or otherwise communicate advertisements, as they would not want to spend advertising revenue on users who are not driving past their establishments. Therefore, in this example, only the Establishment C advertisement is displayed to the user in the vehicle.

In embodiments, the invention provides a method that performs the process of the invention on a subscription, advertising, and/or fee basis. That is, a service provider, such as a Solution Integrator, could offer to provide advertisements based on a predicted direction of travel of a user. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for providing advertisements based on a predicted direction of travel of a user. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    determining, using at least one computing device, a current location of a user based on a positioning system;
    predicting, using at least one computing device, a real-time change of direction of the user;
    providing at least one advertisement to the user based on the predicted real-time change of direction of the user; and
    providing another advertisement to the user different from the at least one advertisement in response to a vehicle traveling in a same direction for a predetermined period of time without activation of a turn signal,
    wherein the user is in the vehicle and the predicted real-time change of direction is based on activation of the turn signal and the positioning system,
    the providing of the at least one advertisement to the user occurs at a same time as the predicted real-time change of direction of the user,
    the providing of the at least one advertisement to the user comprises displaying the at least one advertisement to the user on at least one display in the vehicle, and
    the providing of the another advertisement to the user comprises displaying the another advertisement to the user on the at least one display in the vehicle.

2. The method of claim 1, wherein the at least one advertisement is stored on a remote computing device from the user and provided to the user based on an anticipated location of the user.

3. The method of claim 1, wherein:
    the at least one advertisement is selected from a plurality of advertisements, each of which is associated with a location; and
    the at least one advertisement is associated with a predicted upcoming location of the user based on the predicted real-time change of direction.

4. The method of claim 3, wherein the at least one advertisement includes one of coupons, promotions, directions, and advertising.

5. The method of claim 3, wherein the at least one advertisement is further selected based on one of demographics of a user.

6. The method of claim 1, wherein the predicted real-time change of direction is determined on a computing system located remotely from the user.

7. The method of claim 1, wherein the displaying further comprises displaying the at least one advertisement on a smart phone.

8. The method of claim 1, wherein the displaying further comprises displaying the at least one advertisement on a billboard which is located at an anticipated direction of travel of the user, based on the predicted real-time change of direction.

9. The method of claim 1, wherein a service provider at least one of creates, maintains, deploys and supports a computer infrastructure.

10. The method of claim 1, wherein steps of claim 1 are provided by a service provider on a subscription, advertising, and/or fee basis.

11. A system comprising:
    a CPU, a computer readable memory and a computer readable storage medium;
    program instructions to receive a current location based on a positioning system;
    program instructions to detect an indication of a real-time change in direction of a vehicle;

program instructions to predict the real-time change of direction of the vehicle based on the detected indication of the real-time change of direction;

program instructions to select and broadcast at least one of advertisement to at least one user within the vehicle based on the predicted real-time change of direction; and program instructions to select and broadcast another advertisement to the user different from the at least one advertisement in response to the vehicle traveling in a same direction for a predetermined period of time without activation of a turn signal, wherein the program instructions are stored on the computer readable storage medium for execution by the CPU via the computer readable memory, wherein the detected indication of the real-time change in direction comprises detecting an activation of the turn signal in the vehicle and the positioning system, the broadcasting of the at least one of advertisement to the at least one user occurs at a same time as the predicted real-time change of direction, the broadcasting of the at least one of advertisement to the at least one user comprises displaying the at least one of advertisement to the at least one user on at least one display in the vehicle, and the broadcasting of the another advertisement to the user comprises displaying the another advertisement to the user on the at least one display in the vehicle.

12. The system of claim 11, wherein:

the at least one of advertisement is a plurality of advertisements stored in a remote database; and the plurality of advertisements are associated with at least a particular location and which are selected for display based on the predicted real-time change of direction.

13. A computer program product for providing advertisements, the computer program product comprising a computer readable storage medium having program instructions embodied therewith, the program instructions readable/executable by a computing device to cause the computing device to:

determine a current location of a vehicle based on a positioning system;

detect an indication of a real-time change in direction of the vehicle;

predict the real-time change of direction of the vehicle based on the detected indication of the real-time change of direction;

select at least one advertisement of a plurality of advertisements based on the predicted real-time change of direction;

select another advertisement different from the at least one advertisement in response to a vehicle traveling in a same direction for a predetermined period of time without activation of a turn signal; and provide one of the at least one advertisement and the another advertisement to a user, wherein the detecting of the indication of the real-time change in direction comprises detecting of an activation of a turn signal of the vehicle and the positioning system, the providing of the at least one advertisement to the user occurs at a same time as the predicted real-time change of direction, the providing of the at least one advertisement to the user comprises displaying the at least one advertisement to the user on at least one display in the vehicle, and the providing of the another advertisement to the user comprises displaying the another advertisement to the user on the at least one display in the vehicle.

14. The computer program product of claim 13, wherein the plurality of advertisements are stored in a database and are associated with a particular location and establishment.

15. The method of claim 1, wherein the providing of the at least one advertisement further comprises speaking the at least one advertisement through an entertainment system of the vehicle.

16. The method of claim 1, wherein the predicted real-time change of direction is based on activation of the turn signal, the positioning system, and a change in direction in a plurality of wheels of the vehicle.

17. The method of claim 16, wherein the at least one advertisement comprises a coupon of an advertiser.

18. The method of claim 16, further comprising continually updating the at least one advertisement upon detection of a new real-time change in direction based on the turn signal, the positioning system, and the change in direction in the plurality of wheels of the vehicle.

\* \* \* \* \*